July 26, 1960   W. E. ELLIOTT ET AL   2,946,216
METHOD FOR ESTIMATING INTERFACIAL TENSION OF A MINERAL OIL
Filed Sept. 13, 1957   2 Sheets-Sheet 1

Inventors
William E. Elliott
Richard E. Reinhard
by Henry J. Marcinink
Attorney

45 DYNES PER CENTIMETER   25 DYNES PER CENTIMETER   20 DYNES PER CENTIMETER   15 DYNES PER CENTIMETER

SHAPE AND ROUGHNESS OF INDICATOR SPOTS ON OILS OF VARIOUS INTERFACIAL TENSIONS

United States Patent Office 2,946,216
Patented July 26, 1960

2,946,216

METHOD FOR ESTIMATING INTERFACIAL TENSION OF A MINERAL OIL

William E. Elliott, Elm Grove, and Richard E. Reinhard, West Allis, Wis., assignors to Allis-Chalmers Manufacturing Company, Milwaukee, Wis.

Filed Sept. 13, 1957, Ser. No. 683,749

4 Claims. (Cl. 73—53)

This invention relates to a method of determining the interfacial tension of a mineral oil and more particularly to a spot test method by which the interfacial tension of a mineral oil can be quickly and inexpensively determined in the field.

There has been a long standing need for a simple and accurate method of making tests for interfacial tension of mineral oils of the type used as lubricants, hydraulic fluids, and coolants. Heretofore in order to determine the interfacial tension of a mineral oil it has been necessary to employ precise laboratory techniques. A standard laboratory method, such as is prescribed by the American Society for Testing Materials in test designation D971–50, requires the use of expensive apparatus and the skill of highly trained personnel. The laboratory method is also time consuming. The standard method of the prior art requires generally about forty-five minutes exclusive of the time required to prepare the sample for delivery to and from a laboratory. A determination, according to this invention, of the interfacial tension of an oil can be made in approximately five minutes in the field.

The current practice among utility operators who use mineral oils extensively in the cooling of transformers is to periodically send to a laboratory samples of oil taken from transformers in use. In determining the suitability of a used transformer oil for continued use, it is necessary to make several tests. As the oil deteriorates in the course of service, the dielectric strength of the oil decreases and also a sludge tends to form resulting from the oxidation of the oil. The dielectric property of a transformer oil can be readily ascertained in the field by methods which are well known in the art. To determine the suitability of an oil for continued use, it is customary to determine both the interfacial tension and the acid number of the oil. According to the present criteria for evaluating the suitability for continued use of a transformer oil, an oil having an acid number above 0.20 (milligrams of potassium hydroxide per gram of the oil tested) and an interfacial tension below 20 (dynes per centimeter) is considered unsatisfactory. Chromatographic methods of testing oil for acidity such as are described in the patent to Bergstrom et al., U.S. 2,770,-530 are well known in the art. However, no satisfactory spot method of determining the interfacial tension of oil has hitherto been developed.

Although the utility of the method of the present invention is described in connection with its application to field testing of transformer oils, it should be readily apparent that the present method can be used whenever it is necessary to determine the interfacial tension of any oil. In many hydraulic systems, it is likewise important to determine the sludge forming tendency of the hydraulic oil used in order to check the suitability of the oil for continued service. The method of this invention is not limited to field testing but is also useful in a laboratory as a quick means for determining the interfacial tension of an oil.

According to the spot test method of the present invention the interfacial tension of a mineral oil is estimated by wetting a suitable porous medium with a small quantity of a sample of the oil to be tested to form a spot, placing a drop of a suitable polar indicator solution into the center of the spot formed by the oil, and measuring the number of seconds required for the center of the indicator spot to appear uniformly dry. The center drying time, as the term is used herein, refers to the time measured from the instant the indicator contacts the oil spot to the instant that the indicator spot appears to be uniformly dry. In accordance with the present invention, it has been found that the center drying time, the shape and roughness of the indicator spot give a quantitative estimate of the interfacial tension.

It is, therefore, a principal object of the present invention to provide a method for estimating the interfacial tension of an oil that can rapidly and readily be performed in the field.

It is another object of the present invention to provide a method for determining the interfacial tension of an oil with a range of sensitivity that makes it possible to use the method in determining the suitability of mineral oils for continued use in service.

A further object of this invention is to provide a method of testing a mineral oil whereby it can be quickly determined whether the interfacial tension of the oil falls above or below a predetermined limit.

It is still a further object of this invention to provide a method of testing a mineral oil that does not require the use of expensive laboratory equipment and highly trained technical personnel.

Other objects and advantages obtained by the practice of the present invention will become apparent as the following specification is read in conjunction with the accompanying drawings, wherein.

The first step involved in the preferred method for estimating the interfacial tension of an oil involves wetting a suitable porous medium, such as filter paper, with a small quantity of the oil to be tested. A suitable porous medium for the purpose of the present invention is one that has the following characteristics:

(1) It is formed in a flat thin surface having uniform adsorptive properties.

(2) It is light in color so that the indicator spot can be sharply defined against the oil spot.

(3) It must not dissolve in either the oil or the indicator solution.

A class of porous media found to be particularly suitable for the purpose of this invention are the analytical filter papers. Whatman No. 4 filter paper was found to give very satisfactory results.

For the purpose of standardizing the tests, three drops of oil were used to wet the paper and provided an adequate wetted area. An oil spot formed by three drops of oil or not less than .08 milliliters of oil covered a sufficiently large area to contain the polar indicator solution spot. If the oil spot is not large enough, the spot formed by the indicator solution will move past the periphery of the oil spot. The indicator solution will then be rapidly absorbed by the filter paper and a satisfactory determination of interfacial tension cannot be made when this occurs. It was noted that the indicator spot always stayed within the oil spot if the amount of oil used was approximately three times as great as the amount of the indicator solution used. To obtain satisfactory results by the test method of the present invention, it is necessary that the oil spot be formed on the surface of a porous medium that is substantially level.

Figure 1:
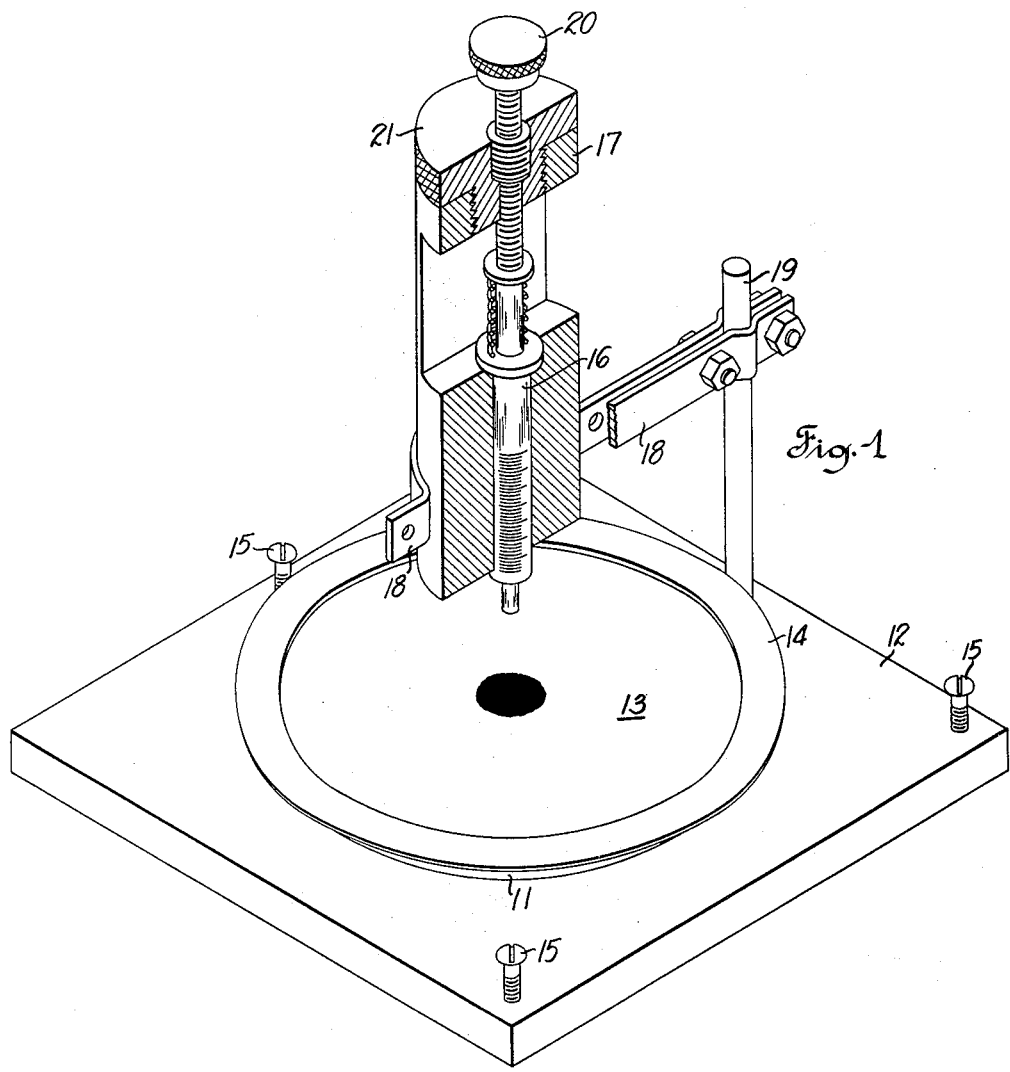
Fig. 1 is a perspective view of the apparatus used to practice the method of testing according to the present invention.

The apparatus used in forming the oil spots according to the preferred method of the present invention is shown in Fig. 1. A pie plate 11 is shown supported on a leveling board 12. The bottom of the pie plate 11 is covered with water. A circular piece of Whatman No. 4 filter paper 13 is placed on the pie plate 11. A ring 14 is placed on the filter paper 13 in such a manner that both the filter paper 13 and the ring 14 set squarely on the rim of the pie plate 11. The pie plate 11 is leveled by adjusting three leveling screws 15.

The oil drops are dispensed by a syringe 16. Before using, the syringe 16 is thoroughly rinsed with oil sample to be tested. The syringe 16 is positioned in a holder 17 supported by a retaining ring 18 clamped to a vertical rod 19. The height of the retaining ring 18 is adjusted so that the tip of the syringe 16 is approximately 1½ inches above the filter paper 13. The syringe 16 is operated by a thumb screw 20 provided in a removable cap 21 of the holder 17. Thus, to release drops of the oil to be tested, the thumb screw 20 is turned.

The time lapse between the application of the indicator drops on the oil spot and the complete absorption of the oil to the paper affect both the center drying time and the reproducibility of the center drying time. The center drying time decreases as this time period increases. It was found that when the time lapse exceeded approximately one minute and forty-five seconds, good reproducible results were obtainable. Thus, after the last trace of the three drops of oil deposited on the filter paper is absorbed, a timer set for one minute and forty-five seconds is started. During this time interval, the oil sample syringe holder is removed from the retaining ring 18 and a holder containing the indicator solution syringe is inserted in the retaining ring 18. The first step of the preferred method of the invention is completed when more than one minute and forty-five seconds have transpired after the oil drops were completely absorbed by the filter paper.

The next step of the preferred method involves placing one drop of a polar indicator solution at the approximate center of the oil drop. The polar indicator solution used to exemplify the preferred practice of this invention is a one percent by weight solution of Erythrosine B in distilled water. The indicator solution can be any one or a combination of such compounds which possess the following characteristics:

(1) It must be more polar with respect to the porous medium than the oil to be tested.

(2) It must ionize or have sufficient dipole strength to be attracted by the porous medium.

(3) It must not be soluble in the oil spot.

The time interval from the instant the indicator drop hits the oil spot until the entire indicator spot appears to be uniformly dry is measured. A stop watch or other convenient time measuring device may be employed to measure this time interval which is referred to herein as the center drying time. The degree of roughness and the shape of the outer periphery of the indicator spot is closely observed and noted.

The reason for adding an indicator to the distilled water is to render the solution more polar with respect to the filter paper than the oil being tested. The Erythrosine B solution in distilled water is preferred because it gives a wide difference in center drying times of different interfacial tensions and forms a spot having a color which clearly distinguishes the shape of the indicator spot against the oil spot. Aqueous solutions of indicators such as the Universal pH indicator, methyl purple, bromothymol blue, phenol red, methyl red and others were found to give satisfactory results.

Care should be exercised to insure that the size of the droplet of the indicator solution should be closely controlled when the interfacial tension is estimated by measuring the center drying time. If a very small indicator drop is used, the indicator solution is absorbed quickly into the paper thereby causing an error in the measurement of the center drying time. Very good reproducibility of results is obtainable when a drop ranging from 0.05 to 0.06 milliliters of the Erythrosine B indicator solution is used.

It should be readily apparent to one skilled in the art that the amount of the oil required to form a spot and the amount of the indicator solution required to form an indicator spot within the oil spot can readily be determined. A function of the indicator solution is to displace the oil and to form a colored spot on the porous medium. Since the behavior of the indicator spot serves as a criterion for estimating the interfacial tension, a sufficiently large indicator spot should be formed to readily permit its shape and the roughness of its periphery to be observed. Any quantity of the indicator solution can be used so long as it does not displace the oil off the paper.

Figure 3:
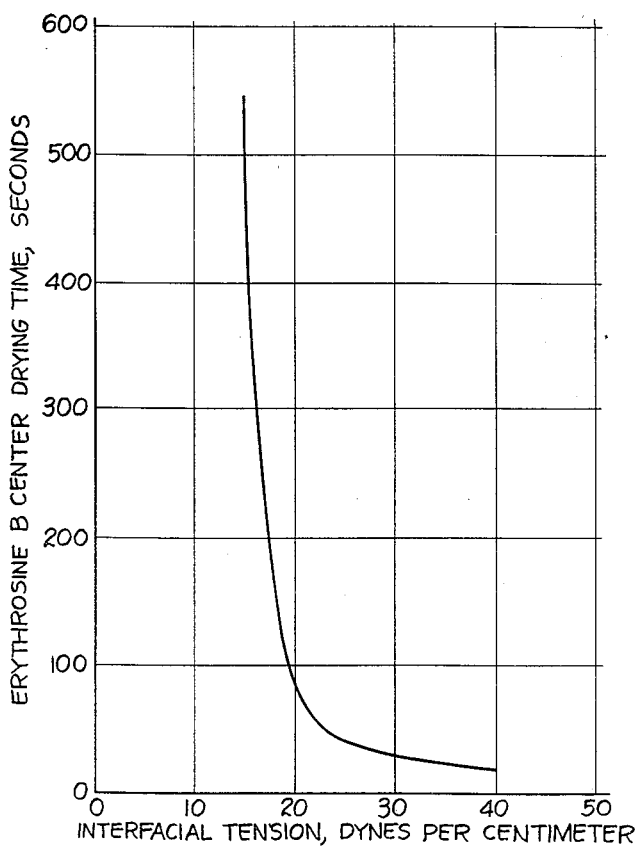
Fig. 3 is a curve showing the center drying time in seconds plotted against the interfacial tension expressed in dynes per centimeter.

The curve shown in Fig. 3 graphically illustrates the relationship between the Erythrosine B center drying time and the interfacial tension of oil samples as determined by standard laboratory methods.

Figure 2:
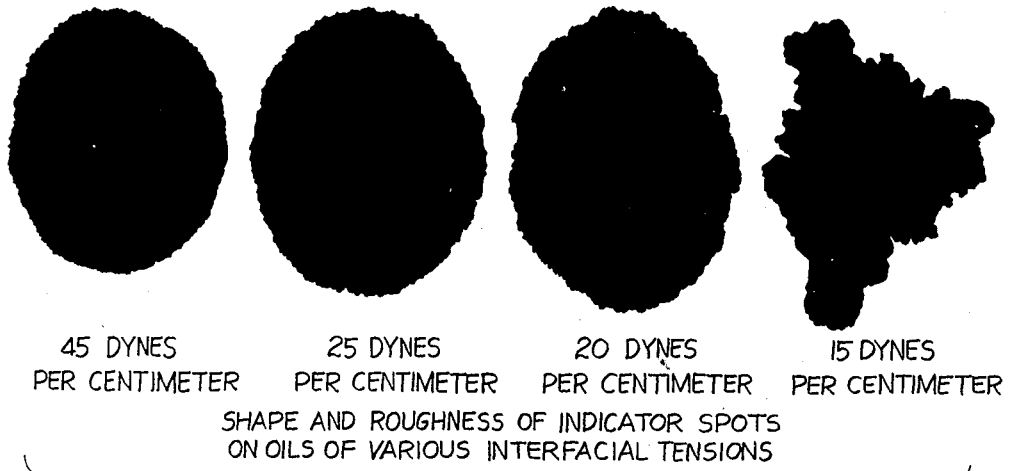
Fig. 2 is a view illustrating four representative indicator spots on oil samples having an interfacial tension of 45, 25, 20 and 15 dynes per centimeter.

As evidenced by the sketches of representative Erythrosine B spots shown in Fig. 2 for a mineral oil having an interfacial tension of 45, 25, 20 and 15 dynes per centimeter, the final shape of the indicator spot obtained on an oil having an interfacial tension more than 25 dynes per centimeter is nearly circular and possesses a smooth periphery. On oils having an interfacial tension below about 25 dynes per centimeter the indicator spots obtained begin to assume a more pronounced noncircular shape and the outer periphery of the indicator spot becomes increasingly more ragged as the interfacial tension decreases. The general shape of an indicator spot obtained on a spot of an oil sample having an interfacial tension of 25 dynes per centimeter or more does not differ to any marked extent from the shape obtained on the spot of a new oil which generally has an interfacial tension of approximately 45 dynes per centimeter.

Since the more pronounced change in the shape of the indicator spot occurs below 20 dynes per centimeter which is the critical range of the oil as far as its interfacial tension is concerned, the shape of the curve may be used to accurately estimate the interfacial tension of an oil in the critical range from 10 to 20 dynes per centimeter. Oils possessing an interfacial tension ranging from 20 to 45 dynes per centimeter are satisfactory so far as the interfacial tension property is concerned. For the purpose of determining the suitability of the oil, it is not necessary to know the exact value above 20 dynes per centimeter. It is sufficient to determine that it has a value above this critical point. If it does, the oil is satisfactory as far as the interfacial tension test is concerned. According to the present invention, an oil has an acceptable interfacial tension, assuming that 20 dynes per centimeter is the criterion, when the shape of the indicator spot formed by the present method is generally circular in shape and does not have a very ragged periphery. A more accurate estimate can be made by comparing the shape of the indicator spot obtained on the oil being tested with a group of standard shapes for oils of known interfacial tensions.

To determine the degree of agreement between the results obtained by the spot tests of this invention and the results obtained by the standard testing method prescribed by the American Society for Testing Materials in Test Designation D971–50, both test methods were employed on 134 oil samples. A limit of 18 dynes per centimeter was arbitrarily selected as a criterion of suitability. The evaluation of the oil samples based on the spot tests conducted according to the present invention agrees with those based on the standard laboratory test method for substantially all of the oils tested. The oil samples which did not check out were usually in a borderline condition.

The mechanism of the method of the present invention is not clearly understood. It is believed that the time required for the center of the indicator spot to assume a dry appearance is actually a quantitative measure of the concentration of polar contaminants in the oil and that the form and shape of the indicator spot is directly influenced by the concentration of the polar contaminants in the oil.

A significant feature of the present invention resides in the fact that its range of maximum sensitivity is obtainable in a range below 25 dynes per centimeter. Its minimum sensitivity lies in the range above 25 dynes per centimeter. It is this feature that makes the method of this invention particularly useful in the tests made to estimate the interfacial tension of a mineral oil.

Although the practice of the present invention is described in connection with the use of a particular kind of apparatus, it should be understood that the invention is not limited to the use of any particular apparatus. As an example, an inexpensive field kit has been designed to practice the method of the present invention which utilizes a conventional medicine dropper instead of the more expensive syringe described in the preferred embodiment of the invention disclosed herein. It is immaterial to the present invention whether one particular type of apparatus is used.

Although a preferred procedure has been described to enable one skilled in the art to practice the present invention, it should be understood that the detailed steps and materials used are illustrative of the method and not in limitation thereof. Further, such other modifications and adaptations as would readily occur to one skilled in the chemical arts are intended to be equally contained within the scope of the present invention, the present invention being limited only by the appended claims.

What is claimed is:

1. A method for estimating the interfacial tension of a mineral oil which comprises the steps of: placing a small quantity of said oil on a level piece of filter paper having a polar attraction for said oil and sufficient in amount to form an oil spot thereon; and depositing at the approximate center of said oil spot a small quantity of an aqueous solution rendered more polar with respect to said filter paper than said oil by the addition of one of the group of indicator compounds consisting of a Universal pH indicator, methyl red, bromothymol blue, phenol red, alizarin yellow and Erythrosine B and sufficient in amount to form an indicator spot having a lesser area than said oil spot and confined within said oil spot, said interfacial tension being determined by comparing the shape and roughness of the indicator spot obtained with the shape and roughness of indicator spots of oils having known interfacial tensions.

2. A method for estimating the interfacial tension of a mineral oil which comprises the steps of: placing a quantity of not less than eight milliliters of said oil, on a piece of Whatman No. 4 filter paper to form an oil spot and depositing at the approximate center of said oil spot a drop of approximately from 0.05 to 0.06 milliliters of a polar indicator solution comprising from one to five percent by weight of Erythrosine B in water to form an indicator spot within said oil spot, said interfacial tension being determined by measuring the center drying time of said indicator spot and comparing said measured center drying time with the center drying time of mineral oils having known interfacial tensions.

3. A method for estimating the interfacial tension of a mineral oil which comprises the steps of: placing a small quantity of said oil on a level surface of a porous medium sufficient in amount to form an oil spot thereon; and depositing at the approximate center of said oil spot a small quantity of an indicator solution sufficient in amount to form an indicator spot having a lesser area than said oil spot and confined within said oil spot, said indicator solution being insoluble in said oil and having sufficient dipole strength to be attracted by said porous medium, said interfacial tension being determined by measuring the center drying time of said indicator spot and comparing said measured drying time with the center drying times of mineral oils having known interfacial tensions.

4. A method for estimating the interfacial tension of a mineral oil comprising the steps of: placing a small quantity of said oil on a level piece of filter paper sufficient in amount to form an oil spot thereon; and depositing at the approximate center of said oil spot a small quantity of indicator solution sufficient in amount to form an indicator spot having a lesser area than said oil spot and confined within said oil spot, said indicator solution being insoluble in said oil and having sufficient dipole strength to be attracted by said porous medium, said interfacial tension being determined by comparing the shape and roughness of the indicator spot obtained with the shape and roughness of indicator spots of oils having known interfacial tensions in order to determine the interfacial tensions of said oil tested.

References Cited in the file of this patent

UNITED STATES PATENTS

| | | |
|---|---|---|
| 2,217,175 | Ledbetter | Oct. 8, 1940 |
| 2,302,224 | Jones | Nov. 17, 1942 |

OTHER REFERENCES

Journal of Scientific Instruments, vol. 27, pp. 67–69, March 1950.